US010053618B2

United States Patent
Nguyen et al.

(10) Patent No.: US 10,053,618 B2
(45) Date of Patent: Aug. 21, 2018

(54) METHODS OF ENHANCING AND GENERATING MICROFRACTURES IN SHALE FORMATIONS

(71) Applicant: Halliburton Energy Services, Inc., Houston, TX (US)

(72) Inventors: Philip D. Nguyen, Houston, TX (US); Corneliu Stanciu, Kingwood, TX (US); Jesse Clay Hampton, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/115,889

(22) PCT Filed: Mar. 13, 2014

(86) PCT No.: PCT/US2014/026437
§ 371 (c)(1),
(2) Date: Aug. 1, 2016

(87) PCT Pub. No.: WO2015/137955
PCT Pub. Date: Sep. 17, 2015

(65) Prior Publication Data
US 2017/0145295 A1    May 25, 2017

(51) Int. Cl.
| | |
|---|---|
| *E21B 43/267* | (2006.01) |
| *C09K 8/68* | (2006.01) |
| *E21B 43/26* | (2006.01) |
| *C09K 8/80* | (2006.01) |
| *C09K 8/66* | (2006.01) |
| *E21B 43/263* | (2006.01) |
| *E21B 43/24* | (2006.01) |

(52) U.S. Cl.
CPC ............ *C09K 8/68* (2013.01); *C09K 8/665* (2013.01); *C09K 8/805* (2013.01); *E21B 43/26* (2013.01); *E21B 43/267* (2013.01); *C09K 2208/28* (2013.01); *E21B 43/2405* (2013.01); *E21B 43/263* (2013.01)

(58) Field of Classification Search
None
See application file for complete search history.

(56) References Cited

U.S. PATENT DOCUMENTS

| | | |
|---|---|---|
| 4,424,076 A | 1/1984 | Reed |
| 4,974,678 A | 12/1990 | Himes et al. |
| | (Continued) | |

OTHER PUBLICATIONS

International Search Report and Written Opinion of PCT Application No. PCT/US2014/026437 dated Dec. 12, 2014: pp. 1-15.

(Continued)

*Primary Examiner* — Angela M DiTrani
*Assistant Examiner* — Andrew Sue-Ako
(74) *Attorney, Agent, or Firm* — Chamberlain Hrdlicka

(57) ABSTRACT

Methods for treating a shale formation may include injecting a pad fluid including a shale stabilizing agent into a shale formation to generate one or more fractures. The method may also include injecting a fracturing slurry including proppant particulates into the one or more generated fractures such that the proppant particulates form microfractures along shale fracture faces. At least a portion of the proppant particulates may be at least partially coated with at least one oxidizing agent.

8 Claims, 2 Drawing Sheets

(56) References Cited

U.S. PATENT DOCUMENTS

| | | | |
|---|---|---|---|
| 5,097,094 A | | 3/1992 | Martin et al. |
| 2005/0006093 A1 | | 1/2005 | Nguyen |
| 2009/0008093 A1 | * | 1/2009 | Duenckel ............... C09K 8/805 166/280.2 |
| 2010/0101795 A1 | | 4/2010 | Watson et al. |
| 2010/0243251 A1 | | 9/2010 | Luharuka et al. |
| 2011/0240292 A1 | | 10/2011 | Dusterhoft et al. |
| 2012/0227967 A1 | | 9/2012 | Shaikh et al. |
| 2012/0305255 A1 | * | 12/2012 | Zavolzhskiy ........... E21B 43/26 166/308.1 |
| 2013/0048282 A1 | | 2/2013 | Adams et al. |

OTHER PUBLICATIONS

Buczkowski et al., "Detonation Properties of Mixtures of Ammonium Nitrate Based Fertilizers and Fuels," Central European Journal of Energetic Materials, 2011, vol. 8(2): pp. 99-106.

Kohno et al., "Theoretical Study of the Initial Decomposition Process of the Energetic Material Urea Nitrate," J. Phys. Chem. A, 2003, vol. 107(33): pp. 6444-6450.

* cited by examiner

METHODS OF ENHANCING AND GENERATING MICROFRACTURES IN SHALE FORMATIONS

FIELD

The disclosure generally relates to producing oil or gas from a subterranean formation. More specifically, the disclosure relates to compositions and methods for use in treating subterranean formations by generating microfractures.

BACKGROUND

Unconventional subterranean formations, including shale formations, may require distinct processing from other types of subterranean formations. As used herein, the term "shale" refers to a sedimentary rock formed from the consolidation of fine clay and silt materials into laminated, thin bedding planes. Traditionally, these unconventional formations have been viewed as having non-productive rock by the petroleum industry because they are "tight" and have low permeability. The term "permeability" as used herein refers to the ability, or measurement of a rock's ability, to transmit immiscible fluids, typically measured in darcies or millidarcies. Formations that transmit these fluids readily, such as sandstones, are described as permeable and tend to have many large, well-connected pores. Impermeable formations, such as shales and siltstones, tend to be finer grained or of a mixed grain size, with smaller, fewer, or less interconnected pores. Unconventional formations may also require specialized drilling and completion technologies. Recently, however, there have been a number of significant natural gas discoveries in such formations, which in this economic climate have warranted production.

Fractures are the primary conduit for the production of oil and gas. In unconventional formations, most of the effective porosity may be limited to the fracture network within the formation, but some gas may have also been trapped in the formation matrix, the various layers of rock, or in the bedding planes. To make these types of formations economical, fracturing/stimulation treatments often are advisable to connect the natural microfractures in the formation as well as create new fractures. Creating or enhancing the conductivity of the formation should increase the production of gas from the formation. In other words, the more surface area that can be exposed within the formation through fracturing the formation, the better the economics and efficiency will be on a given well.

Fracturing such formations is typically accomplished by using linear or crosslinked gels or fresh or salt water fluids comprising a friction reduction additive. These water type fracturing treatments are often referred to as "slick water fracs." In such treatments, often the primary objective is to create or connect a complex fracture network, sometimes called a dendritic network, so hydrocarbons may be transported from the reservoir to the well bore in economic quantities.

Problematic in these fractures and fracture networks is the closure/healing of these fractures and or partial or complete proppant embedment resulting from increased closure stress due to high draw down pressures during production as well as potential softening of the formation after exposure to the treatment fluids. Many shales and/or clays are reactive with fresh water, resulting in ion exchange and absorption of aqueous fluids leading to embrittlement of the rock in the formation. The term "embrittlement" and its derivatives as used herein refers to a process by which the properties of a material are changed through a chemical interaction such that a material that originally behaves in a ductile or plastic manner is transformed to a material that behaves in a more brittle manner. Additionally, such degradation may substantially decrease the stability of fractures in the formation, which may cause a decrease in the productivity of the well.

For water sensitive shale formations, which tend to soften when exposed to fracturing fluids, proppant particulates may become embedded or encapsulated completely inside the fracture faces. This may prevent the propped fracture from maintaining its conductive flow path.

As fracture face is generated, fracturing fluid is reacting with the surface. Depending on the type of clays exposed, the clays can swell, slough, become mobile or otherwise become disrupted in the presence of foreign aqueous fluids. The swelling or dispersion of clays can result in subsequent fracture plugging. In addition, in some layered formations, dilation occurs during fracturing, allowing fracturing fluid to invade between layers, where the clays at the exposed surfaces can swell, slough, migrate and flocculate, and essentially plug off the flow paths.

BRIEF DESCRIPTION OF THE DRAWINGS

The accompanying drawings, which are included to provide a further understanding of the disclosure and are incorporated in and constitute a part of this specification, illustrate preferred embodiments of the disclosure and together with the detailed description serve to explain the principles of the disclosure. In the drawings.

DETAILED DESCRIPTION OF THE PREFERRED EMBODIMENTS

Figure 1:
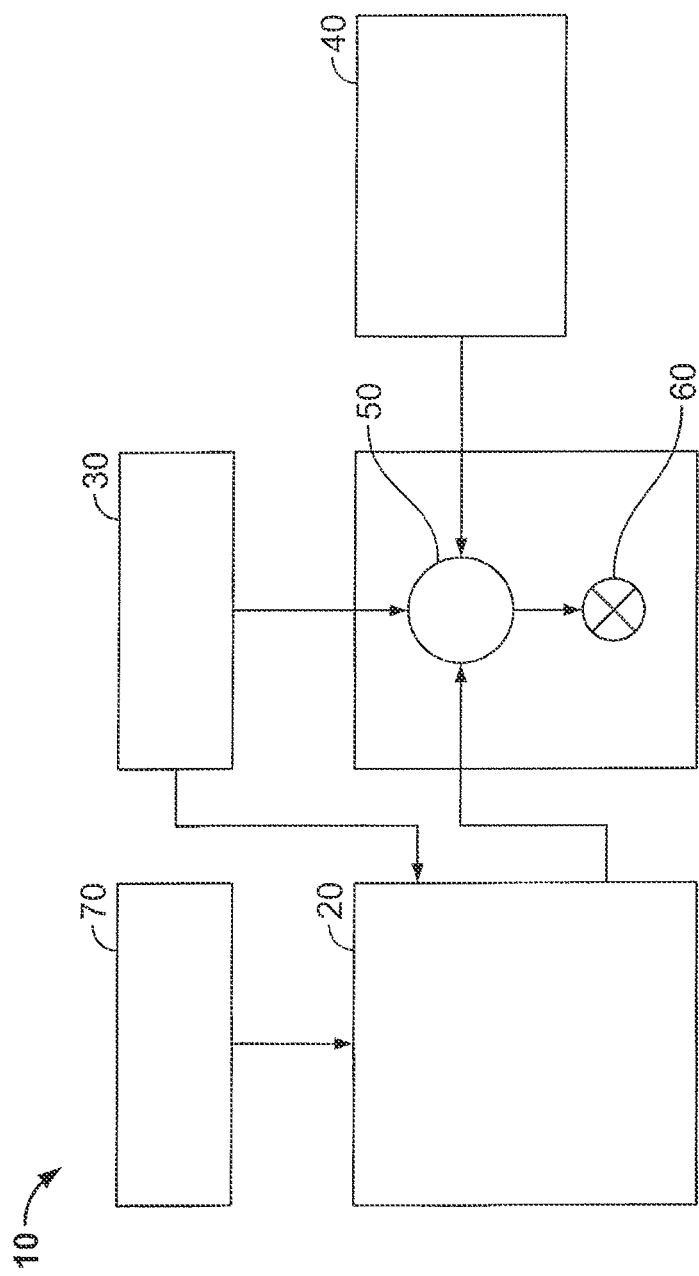
FIG. 1 is a diagram illustrating an example of a fracturing system that may be used in accordance with certain embodiments of the present disclosure.

The present invention relates to methods of treating a subterranean formation, and, at least in some embodiments, to methods of enhancing and generating microfractures to increase and maintain well production in shale formations. The systems and methods described herein may be applied in oilfield drilling applications or for other situations where use of fracturing fluids is advantageous. The examples described herein relate to enhancing generation of microfractures for illustrative purposes only. In alternate embodiments, the systems and methods may be used wherever use of fracturing fluids is desirable. The examples described herein may be applied to shale formations, but may also be applied to other formations as well, such as other unconventional formations.

According to certain embodiments, methods of treating a shale formation may involve injecting a pad fluid containing a shale stabilizing agent into a shale formation to create one or more fractures. The method may then involve injecting a fracturing slurry containing proppant particulates into the one or more generated fractures such that the proppant particulates act as miniature chisels to initiate the formation of microfractures along fracture faces. A chemical reaction between at least one oxidizing agent and at least one reducing agent may create gas and heat that enhances propagation of existing microfractures and/or creates new microfractures along the fracture faces.

Under moderate to high closure stresses, the embedment or intrusion of proppant particles into shale rocks possessing good brittleness properties may be kept to a minimum, while at the same time multiple microfractures may readily form. The microfractures may initiate from contact points between the fracture face and the proppant particulates or from high stress zones created by a complex geometry of proppant particulates.

In certain embodiments, fluid systems may mitigate the sensitivity of clay-laden shale formations to improve brittleness and hardness, thus minimizing embedment of proppant particulates into the rock formation, and enhancing the ability of the proppant and associated additives to form microfractures along the fracture faces of the created fractures.

In certain embodiments, a method of enhancing generation of microfractures may include injecting a pad fluid containing at least one shale stabilizing agent into a shale formation interval to generate one or more fractures. Shale fracture faces may be treated with the stabilizing agent to enhance the brittleness of these surfaces and their vicinity, transforming them at least partially from ductile to brittle. A fracturing slurry carrying proppant particulates may be injected into the generated fractures. The effect of proppant embedment into the fracture face may be minimized after the placement of proppant particulates into a fracture and after the fracture closes. The proppant particulates may act as miniature chisels to initiate the formation of microfractures along the fracture faces.

At least a portion of the proppant particulates may be at least partially coated with at least one in-situ explosive gas and heat generating agent and at least one activating agent. As used herein, the term coating may include any association between coating materials and proppant particulates, including, but not limited to, coating, encapsulation, partial coating or encapsulation, covalent association, ionic association, bonding, adhesion, etc. Coatings may deteriorate in various ways. For example, a coating may deteriorate over time, such as in a slow or delayed release formulation. Coatings may also deteriorate via pressure, such as cracking or breaking when a fracture closes due to increased pressure. Coatings may also deteriorate in the presence of an oxidizing and/or reducing agent. The coating may be selected and applied to have properties relevant to particular embodiments. For example, a coating may be selected to remain intact during injection of the pad fluid, but deteriorate immediately or over time upon injection of the fracturing fluid. In various embodiments, the coating may contain the relevant oxidizing or reducing agent. In various embodiments, the relevant oxidizing and/or reducing agent may be coated on the proppant particulates and then covered with another coating. The coating does not need to cover or surround individual proppant particulates.

In certain embodiments, the at least one in-situ explosive gas and heat generating agent may be at least one oxidizing agent and the at least one activating agent may be at least one reducing agent. In certain embodiments, the at least one in-situ explosive gas and heat generating agent may be at least one reducing agent and the at least one activating agent may be at least one oxidizing agent. In certain embodiments, the same particle may be at least partially coated with both at least one in-situ explosive gas and heat generating agent and at least one activating agent. The at least one in-situ explosive gas and heat generating agent may be separated from the at least one activating agent by a physical barrier, such as a coating. In certain embodiments, a portion of the proppant particulates may be at least partially coated with both at least one in-situ explosive gas and heat generating agent and different portion of the proppant particulates may be at least partially coated with at least one activating agent.

In certain embodiments, the pad fluid includes at least one in-situ explosive gas and heat generating agent and/or at least one activating agent. In certain embodiments, the fracturing fluid includes at least one in-situ explosive gas and heat generating agent and/or at least one activating agent. In certain embodiments, the pad fluid includes at least one in-situ explosive gas and heat generating agent and at least a portion of the proppant particulates are at least partially coated with at least one activating agent. In certain embodiments, the pad fluid includes at least one activating agent and at least a portion of the proppant particulates are at least partially coated with at least one in-situ explosive gas and heat generating agent. In certain embodiments, the fracturing fluid includes at least one in-situ explosive gas and heat generating agent and at least a portion of the proppant particulates are at least partially coated with at least one activating agent. In certain embodiments, the fracturing fluid includes at least one activating agent and at least a portion of the proppant particulates are at least partially coated with at least one in-situ explosive gas and heat generating agent. In certain embodiments, the pad fluid includes at least one in-situ explosive gas and heat generating agent and the fracturing fluid includes at least one activating agent. In certain embodiments, the fracturing fluid includes at least one in-situ explosive gas and heat generating agent and the pad fluid includes at least one activating agent.

The reaction of at least one in-situ explosive gas and heat generating agent with the at least one activating agent may allow a high volume of gas and heat to be generated. The generation of gas and heat may enhance propagation of existing microfractures that have been initiated by the proppant and/or create new microfractures along the fracture faces.

The reaction of the at least one in-situ explosive gas and heat generating agent with the at least one activating agent may result in a delayed creation of gas, pressure, and heat. The created gas may expand in volume creating pressure and releasing energy that may enhance propagation and expansion of the existing microfractures that have been initiated by the proppant particulates and/or creating new microfractures along the fracture faces. Certain embodiments may enhance microfractures along the fracture face that may remain shut or barely open. The reaction of the at least one in-situ explosive gas and heat generating agent with the at least one activating agent may apply increased pressure and temperature to overcome the strength of the formation. This may lead to creation of microfractures and/or their extension and/or expansion into the formation.

In certain embodiments, the pad fluid used in generating fractures in a shale formation interval may contain at least one shale stabilizing agent capable of enhancing the brittleness and hardness of the shale formation to transform the fracture faces from ductile to brittle during the fracture generating process. In certain embodiments, when the fracture closes, the effect of proppant embedment into the fracture face may be minimized. Proppant particulates may act as chisels to initiate the formation of microfractures. Proppant particulates may act as point loads to transmit closure stress energy into the rock formation sufficient to crack the rock by generating microfractures and may have a dendritic effect.

In certain embodiments, the pad fluid may be an aqueous fluid containing at least: water, one or more shale stabilizing agents, and one or more bases. In certain embodiments, the pad fluid may have a high pH. In certain embodiments, the pH of the aqueous fluid may be greater than approximately 7, greater than approximately 8, and/or greater than approximately 9. In certain embodiments, the pad fluid may have a composition based on a given shale stabilizing agent. In certain embodiments, the pad fluid may optionally include one or more gelling agents. The one or more gelling agents may act as friction reducers. The one or more shale stabilizing agents may be a compound cation.

In certain embodiments, the proppant slurry may be an aqueous fluid containing at least: water, one or more gelling agents, proppant particulates, and one or more bases. The one or more gelling agents may act as friction reducers and/or viscosifying agents. The one or more gelling agents may be used to carry the proppant particulates downhole. The one or more gelling agents may be selected to withstand a certain pH. In certain embodiments, however, non-pH critical methods of transporting reactive components needed to initiate the gas-release reactions, such as encapsulation, may be used. The proppant particulates may be any known proppant particulates, such as natural sand or man-made particulates. The shale stabilizing agent may be a compound cation. Optional components of the proppant slurry may include one or more shale stabilizing agents. Shale stabilizing agents may be utilized if the rock in the target formation is ductile in nature and proppant embedment would be high. Optional components of the proppant slurry may also include one or more breakers and one or more crosslinkers.

Shale stabilizing agents may include, but are not limited to compound cations. Examples of shale stabilizing agents may include, but are not limited to, 1,3-Bis(trimethylammonium)-2-hydroxy propane, 1,3-Bis(triethylammonium)-2-hydroxy propane, 1,3-Bis(dimethyl, ethylammonium)-2-hydroxy propane, 1,3-Bis(tripropylammonium)-2-hydroxy propane, hydroxy aluminum, silicon tetrachloride, zirconium oxychloride, sodium silicate, and combinations thereof.

Examples of bases may include, but are not limited to, sodium hydroxide, potassium hydroxide, rubidium hydroxide, calcium hydroxide, strontium hydroxide, barium hydroxide, sodium hydroxide, lime, amines, and derivatives or combinations thereof.

Placing an in-situ, delayed gas, pressure and heat generating system into the created microfractures may be performed by various methods.

In certain embodiments, at least one oxidizing agent may at least partially coat at least a portion proppant particulates. The coated proppant particulates may be placed into fractures via a fracturing slurry. Post-flushing with at least one reducing agent may activate the delayed gas, pressure and heat generating system.

In certain embodiments, at least a portion of the proppant particulates may be at least partially coated with at least one reducing agent, and post-flushing may be with at least one oxidizing agent to activate the delayed gas, pressure and heat generating system.

In certain embodiments, at least one oxidizing agent may be included in the pad fluid. At least one reducing agent may be at least partially coated on at least a portion of the proppant particulates as part of the proppant slurry.

In certain embodiments, at least one reducing agent may also be included in the pad fluid. At least one oxidizing agent may be at least partially coated on at least a portion of the proppant particulates as part of the proppant slurry.

In certain embodiments, at least one oxidizing agent may also be included in the proppant slurry carrier fluid itself. At least one reducing agent may be at least partially coated on at least a portion of the proppant particulates as part of the proppant slurry.

In certain embodiments, at least one reducing agent may also be included in the proppant slurry carrier fluid itself. At least one oxidizing agent may be at least partially coated on at least a portion of the proppant particulates as part of the proppant slurry.

In certain embodiments, at least one reducing agent may also be included in the pad fluid. At least one oxidizing agent may also be included in the proppant slurry carrier fluid itself.

In certain embodiments, at least one oxidizing agent may also be included in the pad fluid. At least one reducing agent may also be included in the proppant slurry carrier fluid itself.

Examples of oxidants may include, but are not limited to, a nitrate, a chlorate, or a perchlorate, such as ammonium nitrate ($NH_4NO_3$), potassium nitrate ($KNO_3$), or potassium ($KCLO_3$), etc.

Examples of reducing agents may include, but are not limited to, sodium borohydride ($NaBH_4$), formic acid (HCOOH), oxalic acid (($H_2C_2O_4$), coal, iron sulfate ($FeSO_4$), sodium sulfite ($Na_2SO_3$), urea, etc.

The following exemplary methods may be used to apply an in-situ gas, pressure and heat generating system.

Method 1

An oxidant may be used. In certain embodiments, the oxidant may be ammonium nitrate (AN)($NH_4NO_3$). Ammonium nitrate is widely used as a fertilizer so it is considered environmentally safe. Ammonium nitrate is readily available and inexpensive, and has the advantage of decomposing without residue as can be seen from the following equations:

$$2NH_4NO_3 \rightarrow 2N_2O + 4H_2O \quad (1)$$

$$2NH_4NO_3 \rightarrow 2N_2 + 4H_2O + O_2 \quad (2)$$

Equation (1) represents the normal thermal decomposition of ammonium nitrate, when heated at temperatures close to its melting point. The overall thermal effect may be small in this case, i.e., only about 36 kJ/mol. When heated in a confined space, however, the decomposition may take a different path, represented in Equation (2). The thermal effect in this last case may be more sizeable, with approximately 237 kJ/mol of heat being liberated in the process. The heat of explosion for ammonium nitrate is only slightly more than ⅓ of the heat of explosion of trinitrotoluene (TNT), but the volume of gas released may be about 30% higher and the detonation velocity may be very high, approximately 3,560 km/s for 94.5% ammonium nitrate. These characteristics may further induce cracks in the main fractures. The heat, pressure, and the volume of gas released and the speed at which this happens may improve generation of microfractures.

Other systems that may be useful may use guanidine nitrate (GN):

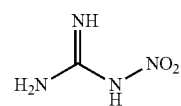

or urea nitrate (UN) ([($NH_2$)COH]$NO_3$). These compounds may decompose with generation of large volumes of gases either by subsequent addition of small amounts of metal powders, such as Al powder, small amounts of concentrated acids, such as nitric acid ($HNO_3$) or sulfuric acid ($H_2SO_4$) or even by the addition of hypophosphites, such as sodium hypophsphite ($NaH_2PO_2$) or calcium hypophosphite ($Ca(H_2PO_2)_2$) or any other reducing agents listed above. A possible decomposition pathway is shown below:

$$[(NH_2)_2COH]NO_3 \rightarrow N_2O+CO_2+NH_3+H_2O \quad (3)$$

Method 2

The proppant may be coated with potassium chlorate ($KClO_3$). This coated proppant may then be blended with a fracturing carrier fluid to be injected and placed in the created fractures. A diluted solution of sulfuric or nitric acid or any other oxidizing acid may be post-flushed into the propped fractures to initiate the gas generation reaction:

$$2KClO_3+H_2SO_4+\text{hydrocarbon} \rightarrow CO_2+H_2O+K_2SO_4+ HCl+\text{heat}$$

Alternatively, the sulfuric acid, nitric acid, or oxidizing acid can also be encapsulated so that the material can be delivered and placed into the created fractures as part of the proppant slurry.

Method 3

The proppant may be coated with a mixture of potassium nitrate ($KNO_3$) and sugar. Sugars may include, but are not limited to, sucrose, glucose, erythritol, xylitol, lactitol, maltitol, mannitol, etc. The coated proppant may then be blended with a fracturing carrier fluid to be injected and placed in the created fractures. A metal powder may be encapsulated to be placed in the created fractures as part of the proppant slurry. The metal powder may include, but is not limited to, aluminum or magnesium. The rupture of the encapsulated particulates containing metal powder may allow the metal to react with the basic solution. The reaction may generate hydrogen gas and heat that may act as a trigger for initiating the reaction of the previous components already coated on the proppant particulates (potassium nitrate and sugar). The rapid chemical reaction between all of these components may generate large volumes of gas in the confined space of the fracture. The generation of gas may cause a large increase in pressure, favoring expansion of the dendritic network of microfractures. A representative equation, using glucose as a sugar, is shown below:

$$C_6H_{12}O_6+12KNO_3 \rightarrow 6CO_2+6H_2O+12KNO_2 \quad (4)$$

The heat necessary to induce oxidation of the sugar by the potassium nitrate may be generated in the reaction between the metal and the hydroxide solution when hydrogen gas and heat is locally produced and may ignite, thus further inducing the sugar oxidation:

$$3Al+3NaOH+9H_2O \rightarrow 3Na[Al(OH)_4]+9/2H_2+\text{heat} \quad (5)$$

Therefore, the present disclosure is well adapted to attain the ends and advantages mentioned as well as those that are inherent therein.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
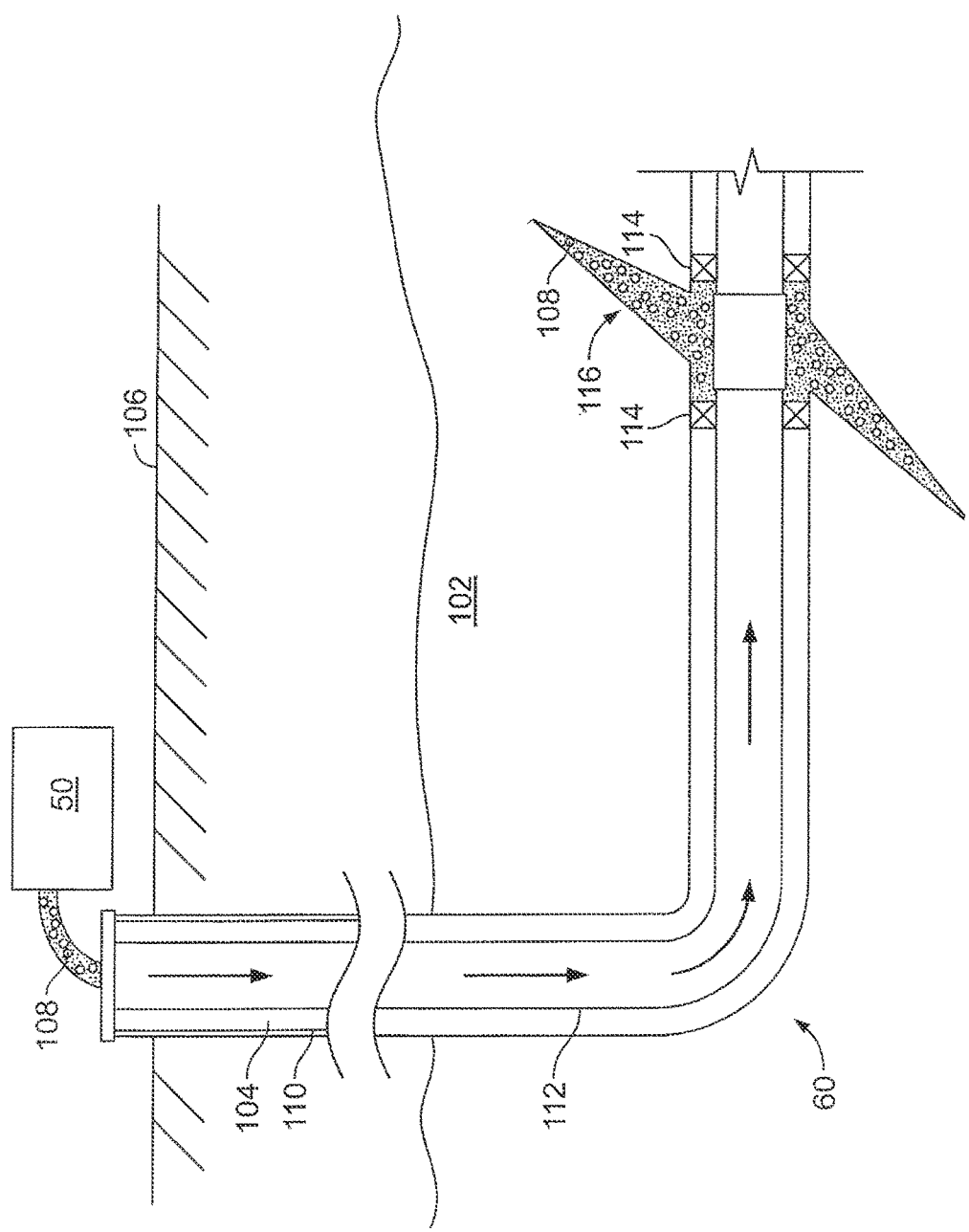
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that one or more of the above embodiments may be combined with one or more of the other embodiments, unless explicitly stated otherwise.

The illustrative disclosure can be practiced in the absence of any element or step that is not specifically disclosed or claimed.

Furthermore, no limitations are intended to the details of construction, composition, design, or steps herein shown, other than as described in the claims.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

Although the foregoing description is directed to the preferred embodiments of the disclosure, it is noted that other variations and modifications will be apparent to those skilled in the art, and may be made without departing from the spirit or scope of the disclosure. Moreover, features described in connection with one embodiment of the disclosure may be used in conjunction with other embodiments, even if not explicitly stated above.

What is claimed is:

1. A method of treating a shale formation, the method comprising:
    injecting a pad fluid comprising a shale stabilizing agent into a shale formation to generate one or more fractures; and
    injecting a fracturing slurry comprising proppant particulates into the one or more generated fractures such that the proppant particulates form microfractures a long shale fracture faces;
        wherein at least a portion of the proppant particulates is at least partially coated with an oxidizing agent to produce a first coating and at least partially coated with a reducing agent to produce a second coating on the first coating; and
        wherein the oxidizing agent is selected from the group consisting of a nitrate, a chlorate, a perchlorate, and combinations thereof,
        wherein the reducing agent is selected from the group consisting of sodium borohydride, coal, iron sulfate, sodium sulfite, and combinations thereof.

2. The method of claim 1, wherein the shale stabilizing agent is a compound cation.

3. The method of claim 1, wherein the shale stabilizing agent is selected from the group consisting of 1,3-bis(trimethylammonium)-2-hydroxy propane, 1,3-bis(triethylammonium)-2-hydroxy propane, 1,3-bis(dimethyl, ethylammonium)-2-hydroxy propane, 1,3-bis(tripropylammonium)-2-hydroxy propane, hydroxy aluminum, silicon tetrachloride, zirconium oxychloride, sodium silicate, and combinations thereof.

4. The method of claim 1, wherein the pad fluid further comprises water, a gelling agent, and a base.

5. The method of claim 1, wherein the fracturing slurry further comprises water and a gelling agent or a friction reducing agent.

6. The method of claim 1, further comprising post-flushing with a reducing agent.

7. The method of claim 1, further comprising mixing the fracturing slurry using mixing equipment.

8. The method of claim 1, wherein the fracturing slurry is introduced into a subterranean formation using one or more pumps.

* * * * *